United States Patent [19]

Christensen

[11] 3,736,793

[45] June 5, 1973

[54] CARTRIDGE FLASH HOLE INSPECTION APPARATUS

[75] Inventor: George L. Christensen, Los Angeles, Calif.

[73] Assignee: Martin Marietta Aluminum Inc., Torrance, Calif.

[22] Filed: Sept. 15, 1971

[21] Appl. No.: 180,789

[52] U.S. Cl. ........................................73/38, 73/167
[51] Int. Cl. ..............................................G01n 15/08
[58] Field of Search ..........................73/38, 40, 49.2, 73/167; 250/219 DF

[56] References Cited

UNITED STATES PATENTS 1,118,478   11/1914   Dixon...................................73/49.2

*Primary Examiner*—Donald O. Woodiel
*Attorney*—Millen, Raptes & White

[57] ABSTRACT

An apparatus for inspecting the number and capacity of vent or flash holes in a cartridge case having an optical tester to count the vent holes and pass a case upon detection of a minimum number of vent holes and an air flow tester for directing a measured flow of air through the vent holes of cartridge cases passed by the optical tester to detect the capacity thereof and pass the cartridge case upon detection of a capacity within predetermined limits.

5 Claims, 10 Drawing Figures

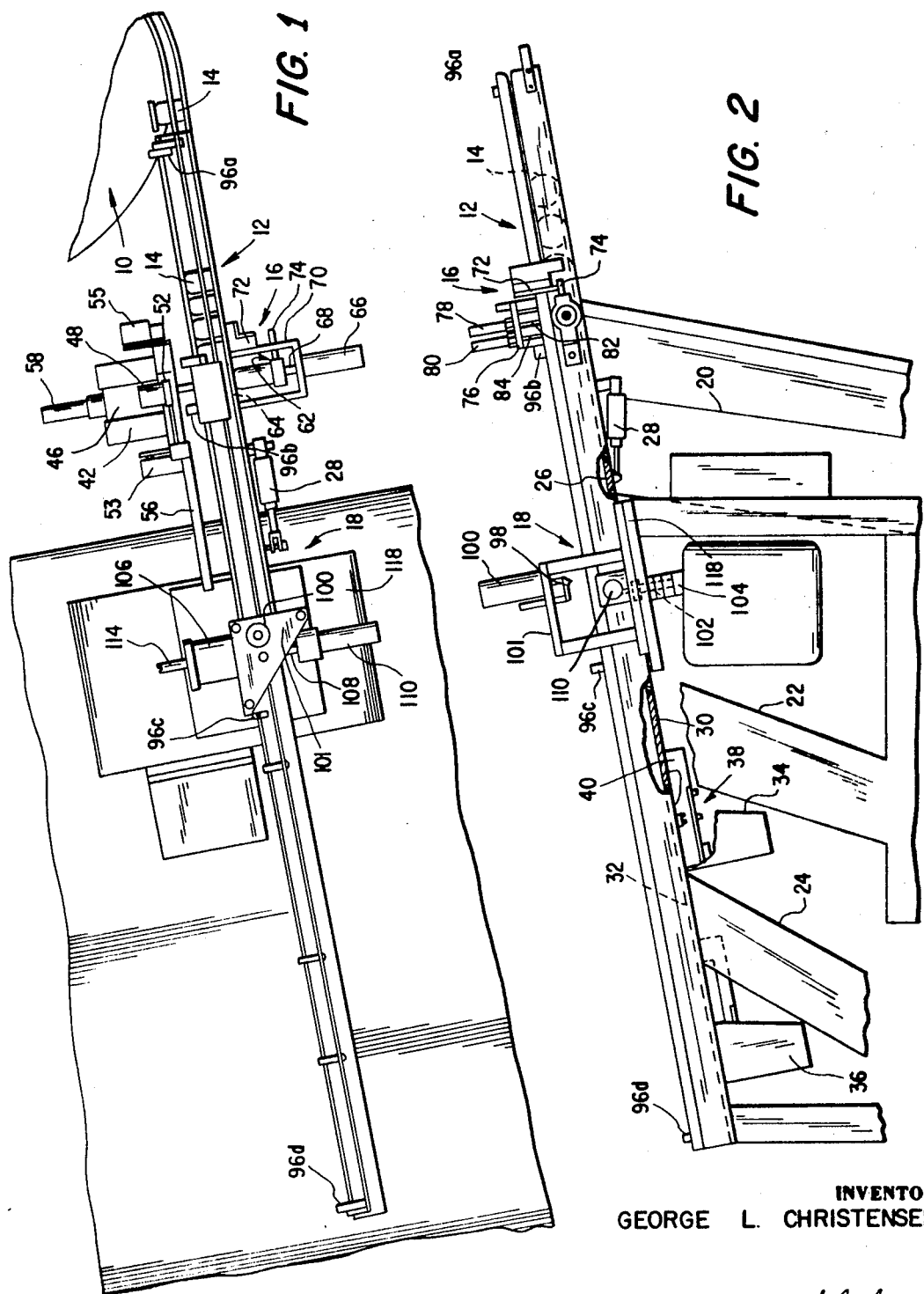

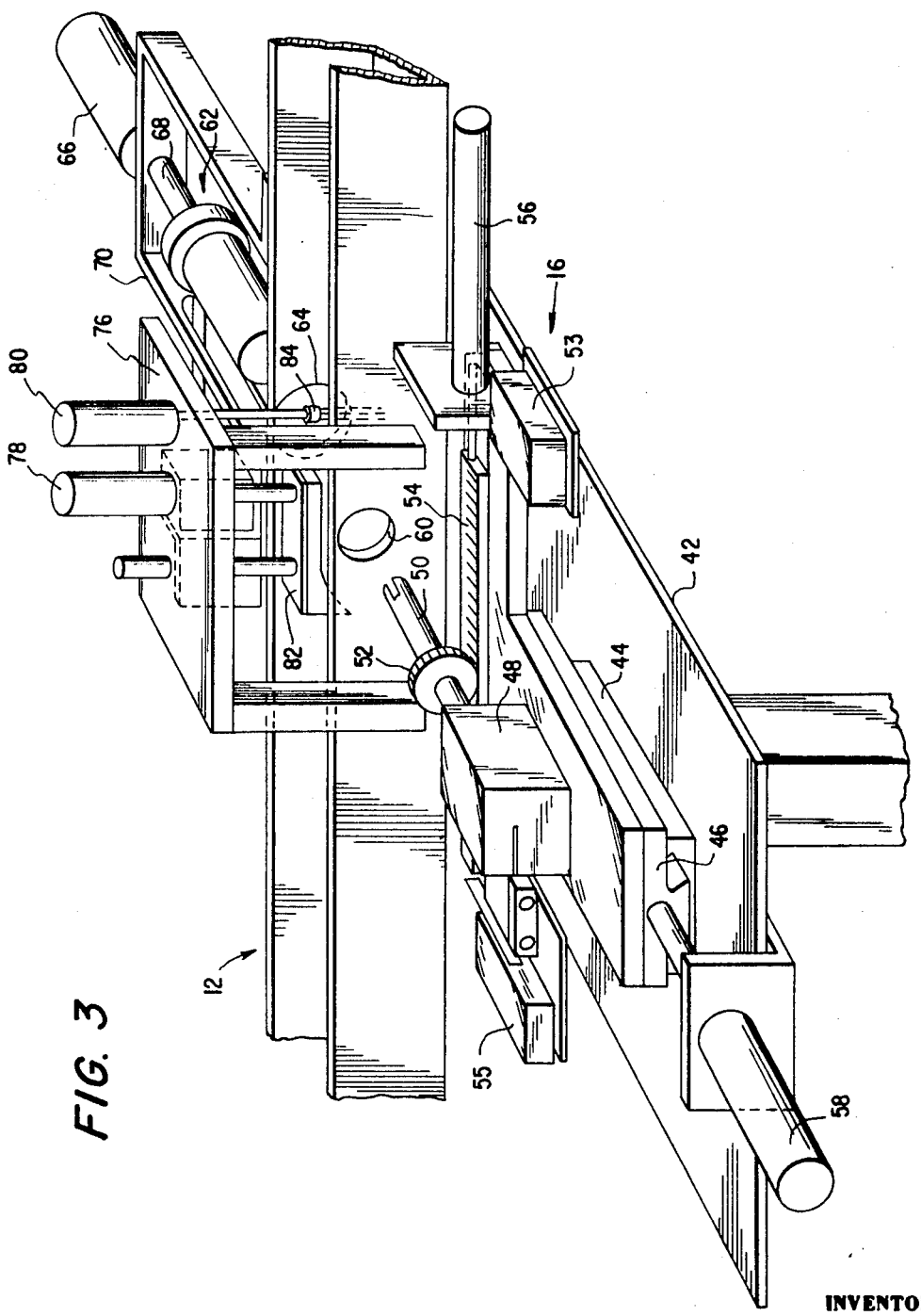

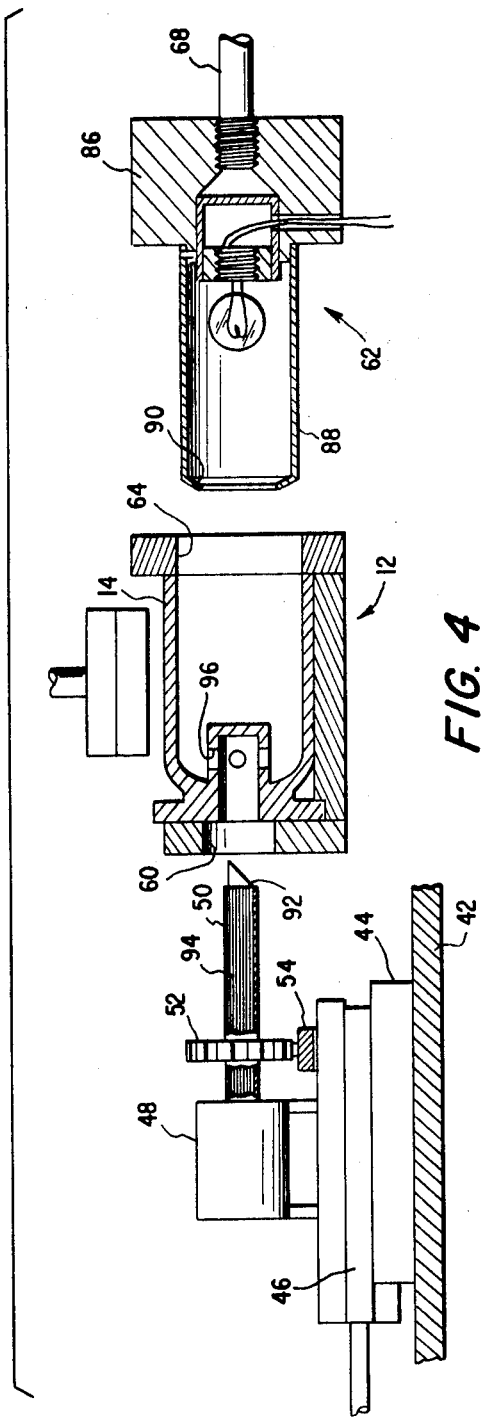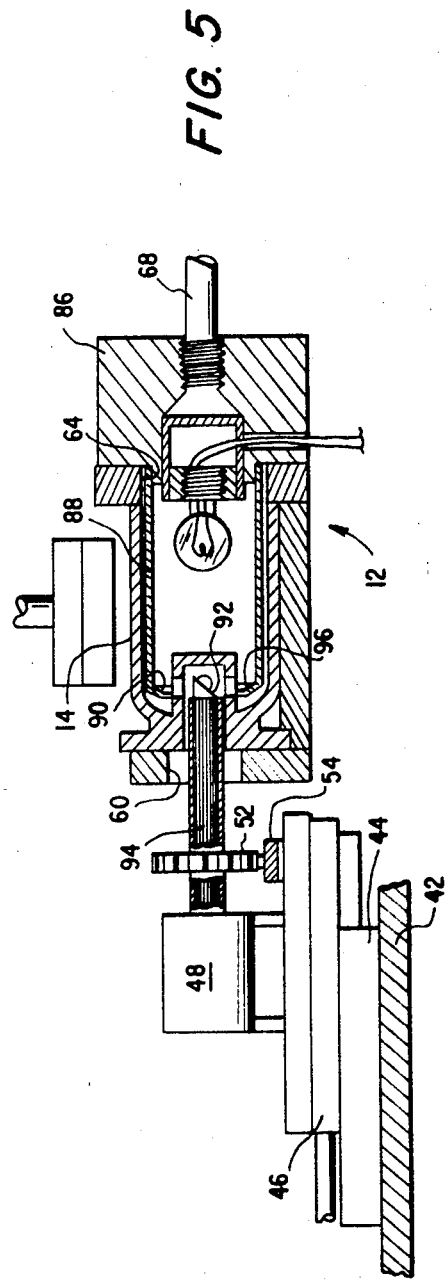

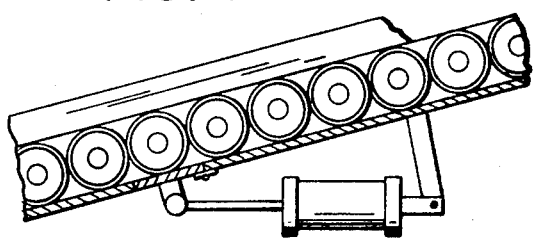
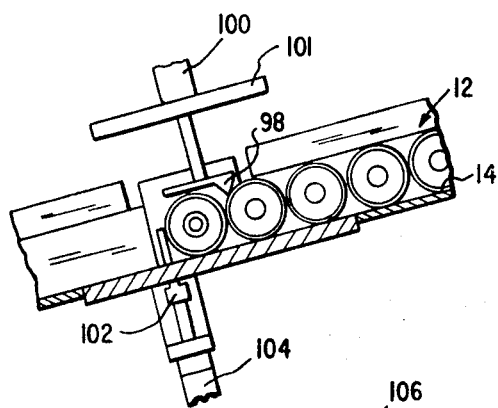
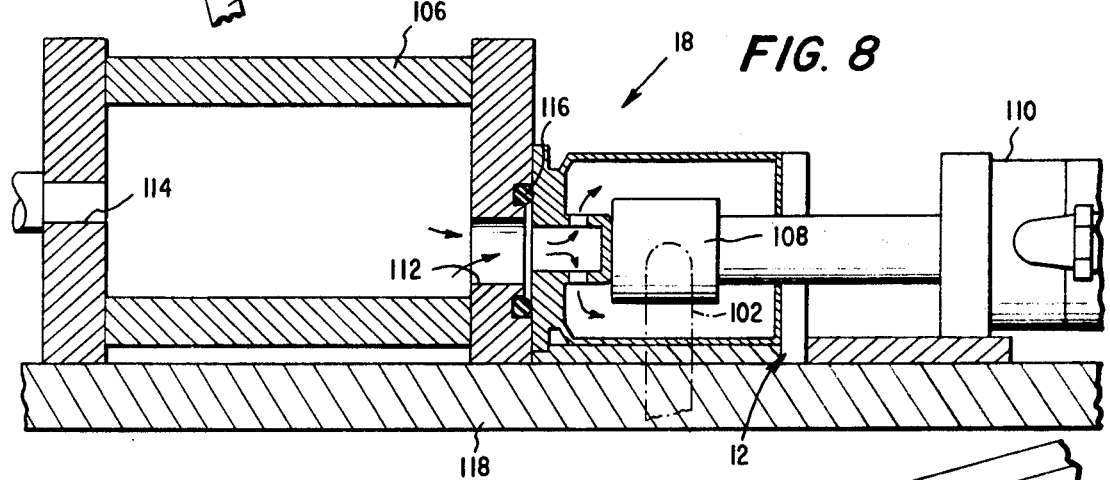
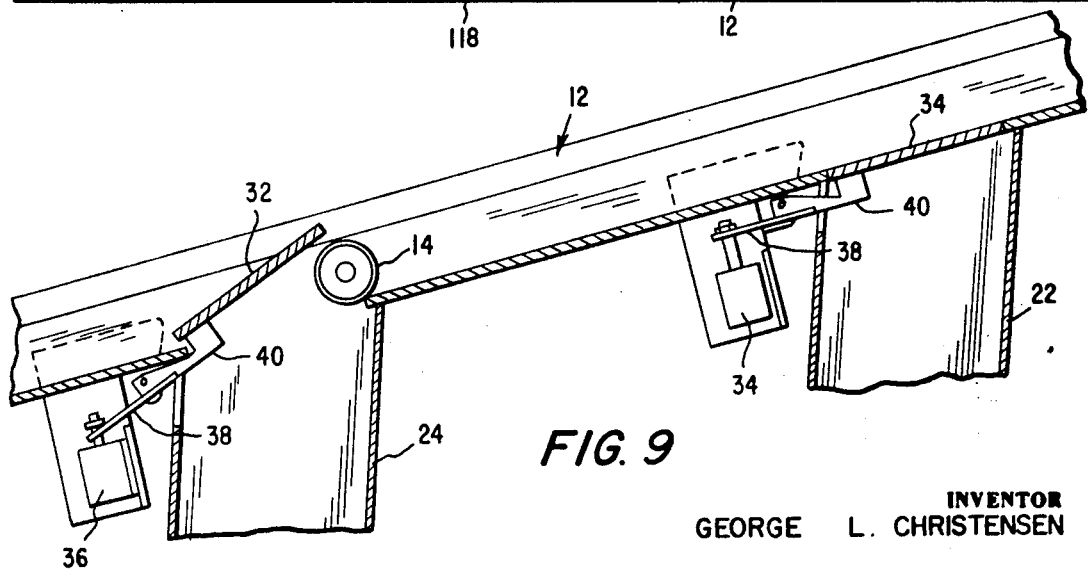
INVENTOR
GEORGE L. CHRISTENSEN
BY Millen, Raptes & White
ATTORNEYS

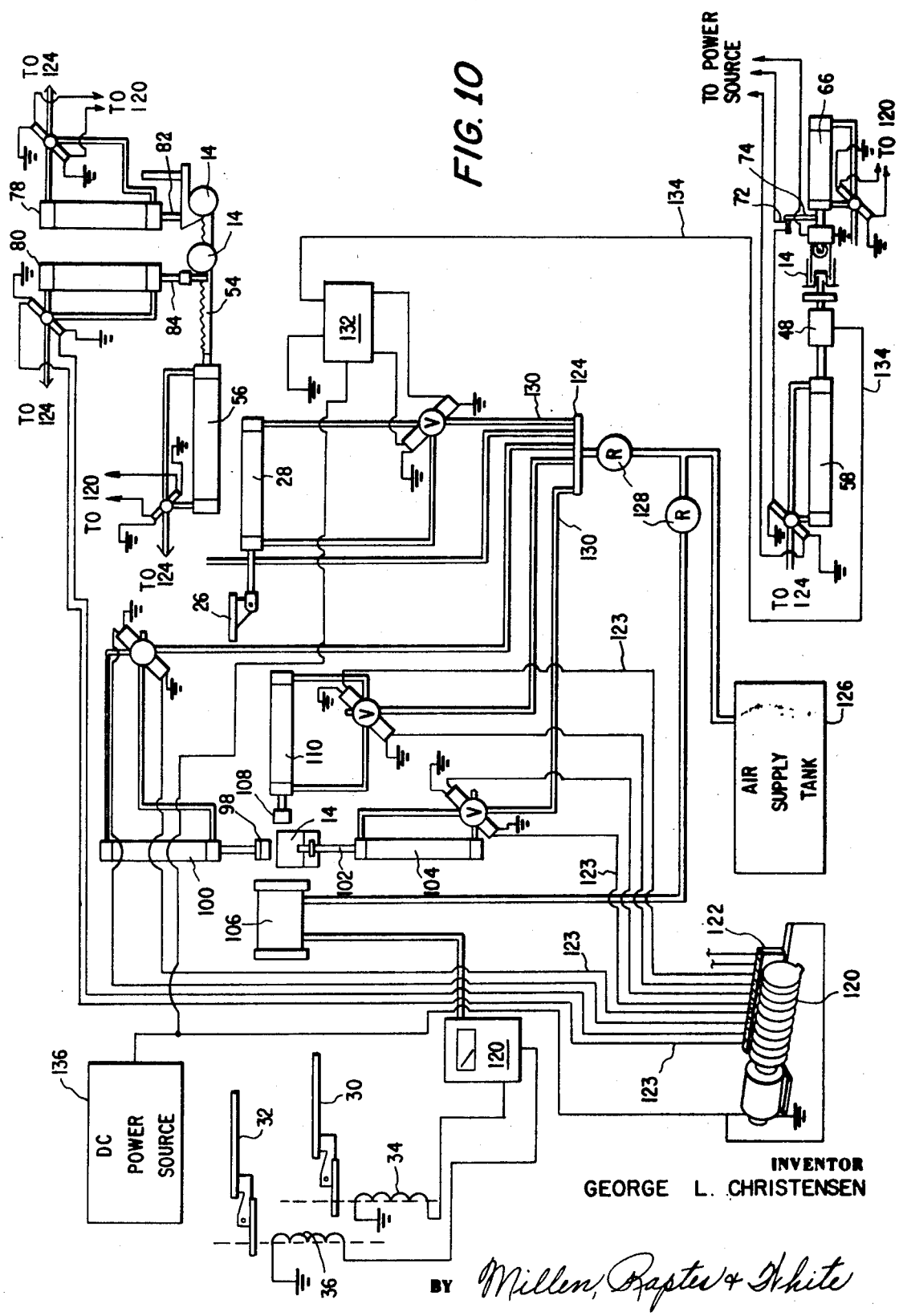

CARTRIDGE FLASH HOLE INSPECTION APPARATUS

BACKGROUND OF THE INVENTION

Cartridge cases for most gun-launched grenades are provided with a propellant cavity through which vent holes are formed to provide a passage between the high pressure and low pressure chambers within the cartridge case proper. The propellant cavity is formed in the base of the cartridge extending into the interior of the cartridge case and having a cylindrical wall coaxially disposed with respect to the cartridge case. The vent holes are generally radially oriented through the cylindrical wall of the cup in equally spaced relationship to one another.

Due to the configuration of the cup, case and vent holes as described above, reliable inspection of the vent holes is difficult on a mass production basis in that it is impossible to pass a direct line-of-sight inspection through the holes and awkward to inspect the vent holes with even oblique, indirect viewing. Such difficulty is even further complicated by the criticality of not only the capacity of openings but the number or distribution thereof. At their optimum, the vent holes not only have the capacity for communication of a predetermined amount of propellant pressure to the low pressure chamber but are distributed for communication of that pressure in a symmetrical pattern such that flight transjectory of the grenade is within close limits. As the fabrication of the vent holes deviates from the optimum, either in capacity or in number or distribution, the proper functioning of the ammunition is jeopardized to a degree which is a function of the amount of deviation. It is, therefore, a requirement of inspection that the vent holes not only be inspected for capacity but also be inspected for distribution and/or number. In other words, through a malfunction during fabrication, the propellant cup may have openings therethrough of sufficient aggregate size to satisfy the capacity requirements and yet the distribution or number thereof may be insufficient to satisfy the pressure distribution requirement or, conversely, the number of vent holes may be sufficient to satisfy the distribution requirement but the aggregate size of the holes may not be within the limits dictated by the capacity requirement.

SUMMARY OF THE INVENTION

This invention proves an inspection apparatus which accurately and reliably inspects vent holes in cartridge cases for compliance with both capacity and distribution requirements by furnishing tests for both number and capacity of the vent holes.

The invention further provides an apparatus which inspects the number and capacity factors of cartridge case vent holes by furnishing an optical scanner for counting the flash holes and a fluid, preferably a gas and most preferably air, pressure application for measuring the capacity thereof.

This invention further provides a novel optical scanner for use in a cartridge case inspection apparatus which provides for inspection of radially oriented vent openings wholly within the case by furnishing a light source simultaneously directed radially through each of the flash holes, a light receiving scanner disposed to sequentially receive light through each of the holes and a counter to count light impulses received during scanning.

In a preferred embodiment, this invention provides an apparatus for inspecting the number and capacity of vent holes in a cartridge case having an optical tester to count the vent holes and pass a case upon the detection of a minimum number of flash holes and a gas tester for directing a gas, preferably air, through the vent holes of cartridge cases passed by the optical tester to measure the gas-flow capacity thereof and pass the cartridge case upon detection of a capacity within predetermined limits.

These and other advantages of the invention will become better understood by those skilled in the art by reference to the following detailed description when viewed in light of the accompanying drawings wherein like numerals indicate like components throughout the figures and wherein:

BRIEF DESCRIPTION OF THE DRAWINGS

FIG. 1 is a plan view of an apparatus embodying the teachings of this invention;

FIG. 2 is an elevational view of the apparatus of FIG. 1;

FIG. 3 is a fragmentary perspective view of the optical testing portion of the apparatus of FIG. 1;

FIGS. 4 and 5 are fragmentary sectional views taken through the optical testing portion of the apparatus of FIG. 1 showing sequences of operation thereof;

FIGS. 6 and 7 are enlarged fragmentary elevational views in section of portions of the apparatus shown in FIG. 2;

FIG. 8 is an enlarged sectional view taken through the gas pressure testing of the apparatus of FIG. 1;

FIG. 9 is an enlarged sectional view similar to FIGS. 6 and 7 showing another portion of the apparatus of FIG. 2; and FIG. 10 is a schematic view of the operating mechanism of the apparatus of FIG. 1.

DESCRIPTION OF THE PREFERRED EMBODIMENT

In FIGS. 1 and 2, the apparatus comprises generally a feeder bowl 10 which communicates with an inspection track 12 to feed a series of cartridge cases to be inspected 14 thereto in a manner known in the art.

The track 12, is provided, intermediate the ends thereof, with an optical testing station and a gas pressure testing station, shown generally at 16 and 18 respectively. The track 12 is also provided, depending therebeneath, with cartridge case reject chutes 20, 22 and 24 which serve to receive and channel cartridges rejected by the testing stations.

The chute 20, located immediately downstream of the optical testing station 16, communicates with the track 12 through a trap door 26 which is actuated by door-actuating cylinder 28 upon signal from the optical testing station 16 as will be described in detail hereinbelow. The cylinder 28, as well as similar actuating cylinders to be described hereinbelow, is preferably pneumatically powered; however, the cylinders may be hydraulically, electrically or otherwise driven if so desired.

The chutes 22 and 24, located downstream of the fluid pressure testing station 18, communicate with the track 12 through trapdoors 30 and 32, respectively, which doors are identically actuated by solenoids 34 and 36, respectively, through linkages shown schematically at 38. The linkage 38, connected to a hinge arm 40 for the trapdoor 30, operates to move the trapdoor upwardly as shown in phantom to deflect cartridge cases having, for example, a capacity tested by the gas pressure tester 18 less than that required for reliable operation while the door 32 is identically deflected by energization of the solenoid 36 to deflect cartridge cases testing over capacity. Cartridges within the capacity limitations of the apparatus continue out of the lower end of the track 12.

With reference to the optical testing station or portion 16 and with particular reference to FIG. 3, the portion comprises a base support 42 disposed beneath the track 12, to which a slide block 44 is fixed and slide 46 is mounted in the block 44 and supports a prism holder 48 which, in turn, rotatably supports a prism mount 50. The prism mount 50 has, coaxially disposed thereon, a gear or pinion 52 which meshes with a rack 54 which rack is driven by a pneumatic cylinder 56. Microswitches 53 and 55 are positioned to operate as reset switches for purposes to be described below. The rack 54 and cylinder 56 are mounted to move with the slide 46 which, in turn, is driven toward and away from the track 12 by a pneumatic cylinder 58 mounted on the base 42. The sidewall of the track 12 has, formed therethrough, an opening 60 to receive the prism mount 50 when extended therethrough and with which a cartridge case-to-be-inspected can be registered as will be described below.

Mounted on the opposite side of the track 12 is a light source 62 which is extendable into the track through an opening 64 in the wall of the track by a pneumatic cylinder 66 connected thereto by a rod 68. The above-described assembly is supported by means of a bracket 70 attached to the sidewall of the track 12. As is best seen by reference to FIGS. 1 and 2, at its innermost travel, the light source 62 engages a microswitch 72 with an arm 74 mounted on the light source to provide for sequencing as will be described in greater detail below.

Disposed above the optical testing portion 16, a platform 76 supports a vertical cylinder 78 and stop cylinder 80 which vertically extend and retract a spacer 82 and a stop 84, respectively, to and from blocking positions in the track 12.

With more particular reference to FIGS. 4 and 5, the operation of the optical testing station can be seen. The light source comprises a lamp and holder assembly 86 and a cylindrical mount 88 having a 360° mirror 90 disposed around the end thereof. The mirror 90 is disposed to direct light rays from the lamp assembly 86 radially inwardly normal to the central axis of the mount 88.

The prism mount 50 has an optical prism 92 mounted on the end thereof which is adapted to direct light rays normal to the axis of the mount 88 received thereby, parallel to the axis of the prism mount 50. The mount 50 comprises a hollow tube 94 for transmitting light from mirror 90 to a photocell or the like (not shown) from which signals are analyzed by means well known in the art such as, for example, a solid state counter utilizing RTL logic (not shown).

A series of air flow switches 96a, 96b, 96c and 96d are disposed along the track 12 to sense the presence of cartridges at selected points for purposes to be described below.

In operation, as thus far described, cartridges 14 are fed from the rotary feeder bowl 10 into the track 12 until a sufficient number have collected to interrupt air flow at air flow switch 96a whereupon power to the feed bowl is shut off by suitable control means (not shown). The cylinder initially extends the spacer 82 to preclude cartridges from entering the optical inspection station 16. With the cylinder 80 extending the stop 84 into blocking position, the cylinder 78 retracts the spacer 82 on command from a sequence timer to be described below, allowing the first of the cartridges 14 to enter the station 16 under the influence of gravity and come to rest against the stop 84. The spacer 82 is then extended to block the next succeeding cartridge.

The light source 62 is then inserted into the cartridge 14 (FIG. 5) by extension of the cylinder 66, thereby exposing the 360° mirror 90 to direct light from the lamp assembly 86 radially inwardly through a series of vent holes 96 within the cartridge case 14. As was set forth above, the inward movement of the light source 62 also causes the arm 74 to engage and close the microswitch which, through circuitry to be described below, extends cylinder 58 to insert the prism mount 50 into the opposite end of the cartridge 14 and position the prism 92 inwardly of the vent holes 96. The sequence timer then commands cylinder 56 to extend, thereby rotating the mount 50 to cause the prism 92 to scan the vent holes 90 and by release of the reset switch 53, to start the counter for light pulses received through the prism mount.

Light transmitted through vent holes 96 is sequentially transmitted as a light pulse through tube 94 to the photocell and a portion or all of the pulses are counted. At the end of the stroke of the rack 54, the switch 55 is closed for actuation of the door actuating cylinder 28 if an insufficient number of pulses are received by the counter during the stroke of the rack 54. Upon retraction of the rack 54, the reset switch 53 is closed resetting the counter for the next cycle.

The cylinder 80 is then retracted by the sequence timer and the cartridge case tested is allowed to roll toward the gas pressure testing station 18. If the number of vent holes counted by the optical testing station 16 is below the minimum number required, the trapdoor 26 is opened as described above and held open by a time delay switch and that cartridge is diverted into the chute 20.

If the cartridge is acceptable, it enters the gas pressure testing station 18, passing under a positioner 98 extendable into the track by cylinder 100 mounted thereabove on a platform 101. A stop 102, spaced downstream from the positioner 98, is similarly extended onto the track 12 by a cylinder 104.

With particular reference now to FIG. 8, the gas pressure testing station 18 comprises a pressure chamber 106 disposed on one side of the track 12 and a ram 108 driven by a cylinder 110 disposed on the other side of the track. The chamber 106 is provided with a testing orifice 112 and a fluid supply inlet 114. An O-ring seal 116 is disposed in an annular recess around the orifice 112. The assembly is mounted on a support platform 118 from which an air gauge 120 depends. The air gauge is of a type known in the art, such as, for example, an air gauge marketed under the trademark "Ames," which can be set to provide an electrical impulse to signal under and over pressure conditions. The gauge 120 communicates with the chamber 106 and serves to monitor the back pressure therein.

In operation, with a cartridge case 14 against the stop 102, the sequence timer extends the cylinder 100 to bring the positioner 98 down on the cartridge. The sequence timer then commands the cylinder 110 to extend, extending the ram 108 to press the face of the cartridge 14 against the chamber 106 so that a fluid seal is provided by the O-ring 116 (FIG. 8). Air then flows out of the chamber 106, as shown by arrows in FIG. 8, through the vent holes 96 in the cartridge 14. Since the aggregate size or capacity of the vent holes is a function of the back pressure in the chamber 106 as determined by the resistance to air flow through the vent holes 96, the pressure in the chamber is an accurate indicator of the capacity of the vent holes. By proper setting of the air gauge 120, under and over capacity signals can be generated when the vent hole capacity of the tested cartridge is beyond desired tolerances. During the above test, the sequence timer provides an energization to the solenoids 34 and 36 which are wired to open either the trap door 30 or 32 if an under capacity or over capacity signal, respectively, is generated by the air gauge 120. If neither signal is generated, then neither door is opened. If either one of the doors 30 or 32 is opened, time delay relays hold them open until the tested cartridge is released and enters the open door. The sequence timer then retracts cylinder 104 to allow the tested cartridge 14 to roll down the track 12 whereupon the cartridge is deflected by open door 30 or 32 into the chutes 22 or 24 (FIG. 9) if over or under capacity signals, respectively, have been generated by the air gauge 120, or if the cartridge is acceptable, to be discharged from the end of the track 12. The air flow switches 96b, 96c and 96d are positioned along the track 12 at points where, if cartridges back up to interrupt the flow thereby due to a malfunction of the apparatus, the apparatus will be deenergized to provide for clearing of the mechanism.

In FIG. 10, a schematic of the system is illustrated. The sequence timer, referred to above, comprises a series of rotary cams 120 which sequentially operate corresponding switches 122 to open and close circuits providing electrical power through conductors 123 to solenoid valves V controlling pneumatic pressure to the various pneumatic cylinders for the apparatus in the order and according to the program set forth above. Pneumatic pressure is supplied to the system through a manifold 124 from an air supply tank 126 at a pressure determined by pressure regulators 128. The air is transmitted through pneumatic conduits 130 to the valves V for the respective cylinders where the pressure is directed to the cylinder according to the energized or deenergized condition of that valve in a manner known in the art.

A counter 132, of a type referred to above, is connected to the prism holder 48 by means of a conductor 134 and serves to energize the valve V for the cylinder 28 to open the trapdoor 26 if the count from the prism is less than that required as was disclosed above.

Electrical power for the apparatus is provided by a power source 136.

What is new and desired to be protected by Letters Patent of the United States is:

1. Apparatus for inspecting the number and capacity of vent holes in a cartridge case comprising:
   optical means to count the number of vent holes and pass said cartridge case upon detection of a minimum number of openings;
   gas pressure means for directing a gas stream through said vent holes in said cartridge cases to detect the aggregate capacity of said vent holes thereof as a function of back pressure and pass said case upon detection of a back pressure within predetermined limits; and
   means to transport said passed cases from one of said optical means and said fluid or air pressure means to the other.

2. Apparatus according to claim 1 wherein said passed cases are transported from said optical means to said gas means.

3. An apparatus in accordance with claim 1 wherein said gas or air pressure means comprises a pressure chamber including an outlet orifice registerable with the flash holes in said cartridge case, means to hold said cartridge case in fluid-tight relationship with said outlet orifice, a source of gas pressure communicative with said chamber and a gas pressure gauge means for detecting the pressure in said chamber.

4. An apparatus in accordance with claim 3 wherein said means to hold said cartridge comprises a reciprocable ram insertable in said cartridge to positively hold said cartridge.

5. An apparatus in accordance with claim 1 wherein said means to transmit comprises a track disposed at an angle with the horizontal.

* * * * *